United States Patent
Salyer et al.

(10) Patent No.: US 6,416,666 B1
(45) Date of Patent: *Jul. 9, 2002

(54) SIMPLIFIED FILTRATION SYSTEM

(75) Inventors: David N. Salyer, Garden Grove; William A. Greene, Gardena; Richard G. Hayes, Huntington Beach, all of CA (US)

(73) Assignee: SpinTek Filtration, LLC, Los Alamitos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/289,515

(22) Filed: Apr. 9, 1999

Related U.S. Application Data

(63) Continuation-in-part of application No. 08/290,244, filed on Aug. 15, 1994.

(51) Int. Cl.[7] .............................. B01D 63/00
(52) U.S. Cl. ..................... 210/321.75; 210/321.84; 210/321.67; 210/321.63; 210/331; 210/332; 210/486; 210/367
(58) Field of Search .................. 210/321.74, 321.84, 210/331, 332, 321.63, 321.67, 486, 321.75, 346; 310/59, 89

(56) References Cited

U.S. PATENT DOCUMENTS

| | | | | |
|---|---|---|---|---|
| 4,025,425 A | * | 5/1977 | Croopnick et al. | 210/486 |
| 4,936,990 A | * | 6/1990 | Brunsell et al. | 210/331 |
| 5,130,585 A | * | 7/1992 | Iwamatsu et al. | 310/59 |
| 5,275,725 A | * | 1/1994 | Ishii et al. | 210/321.67 |
| 5,679,249 A | * | 10/1997 | Fendya et al. | 210/321.63 |
| 5,939,807 A | * | 8/1999 | Patyk et al. | 310/89 |

* cited by examiner

Primary Examiner—Ana Fortuna
(74) Attorney, Agent, or Firm—Leon D. Rosen

(57) ABSTRACT

A filtration apparatus includes a container (24) that surrounds at least one rapidly rotating membrane pack (32, FIG. 2) and stationary turbulators (36A, 36B) slightly spaced from the membrane pack surfaces to leave thin gaps (40A, 40B) between them, which obtains the advantages of both series-connected and parallel-connected systems. A feed conduit (82) connects the radially outer ends (110) of the gaps, to carry feed fluid into and out of each gap, with radially outward flow (94) near the pack surfaces, causing radially inward flow (102) near the surfaces of the turbulators. The turbulators have recesses that leave projections to promote fluid shear at the membrane surfaces. A motor shaft (314) supported on motor bearings, has a motor housing fixed to the container. The motor shaft extends into the container and holds the membrane pack to spin it, so only the motor bearings (316, 318) support all rotating parts. The motor shaft has a passage (340) extending along its length to carry out filtrate from the membrane pack.

11 Claims, 6 Drawing Sheets

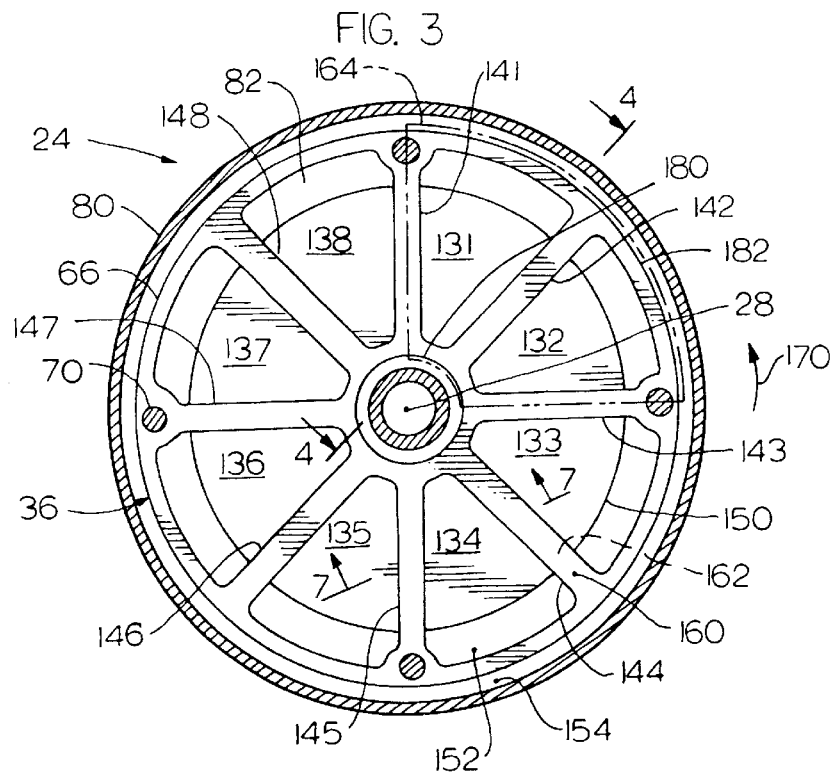
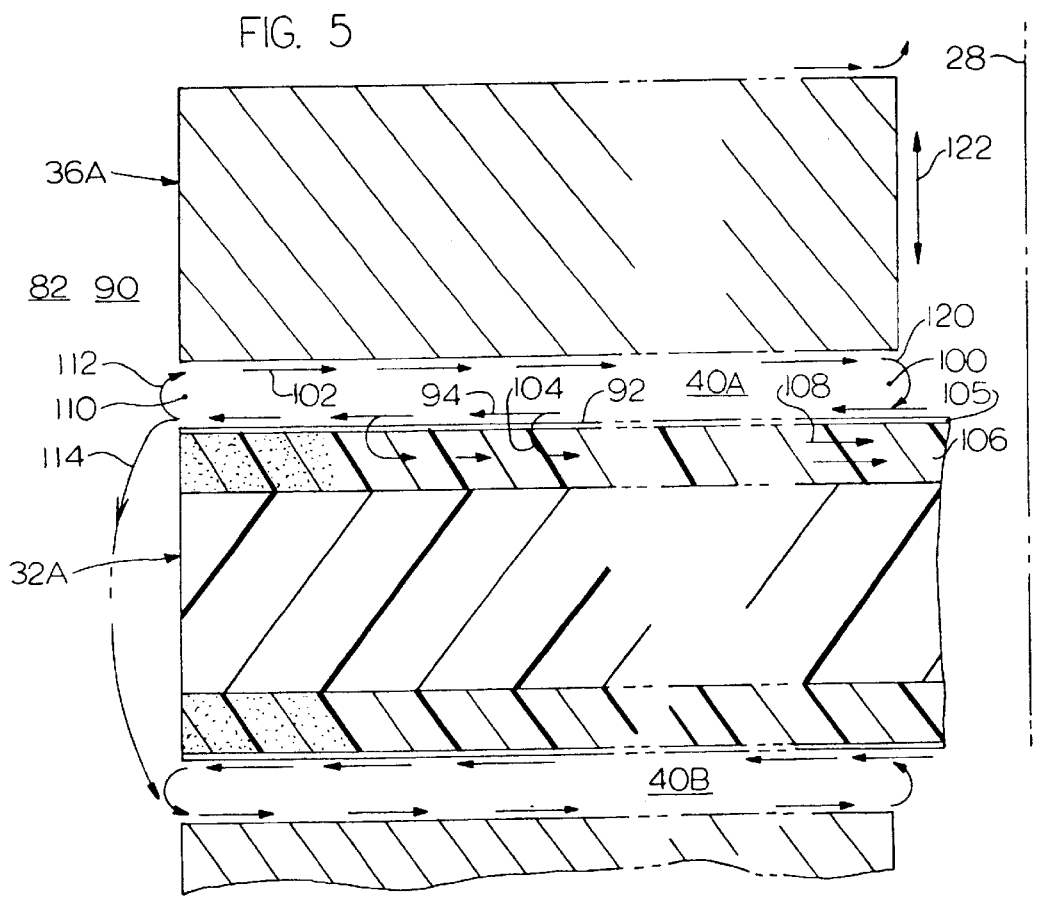

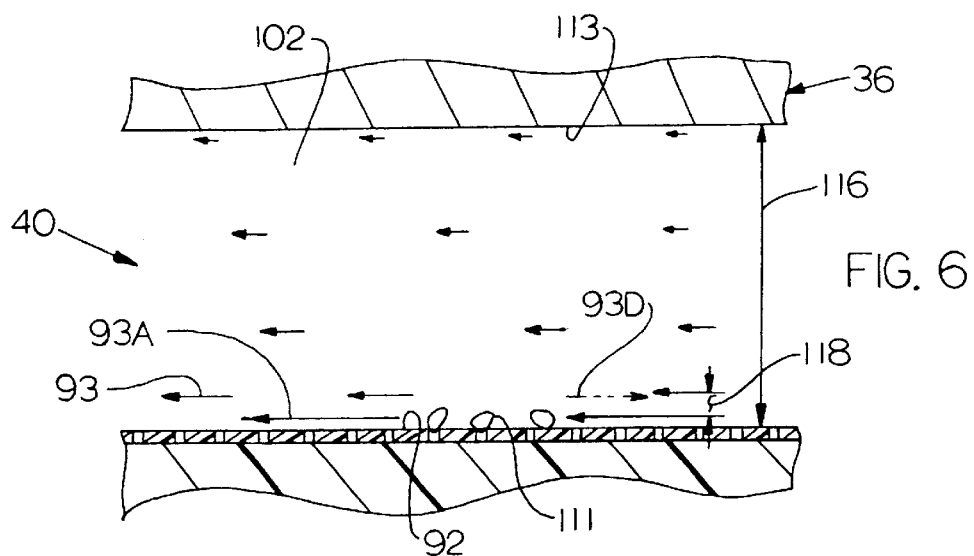
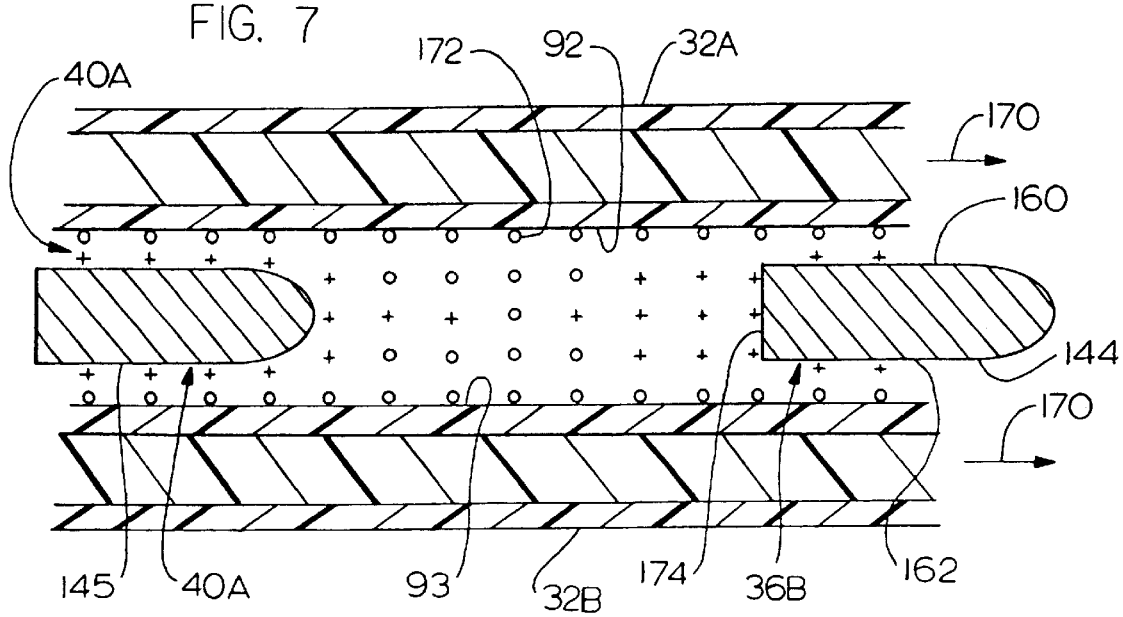

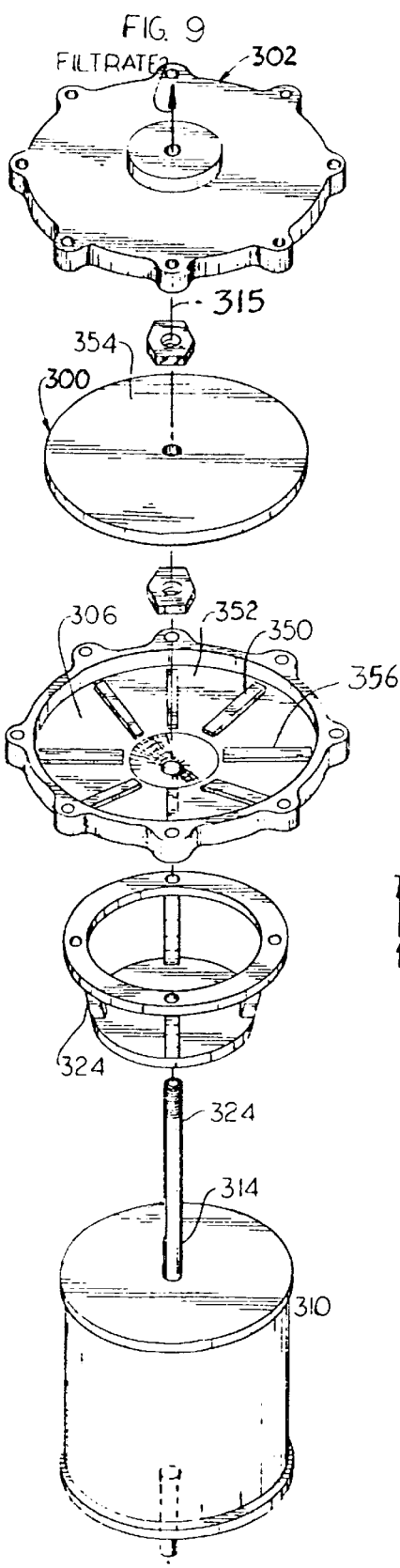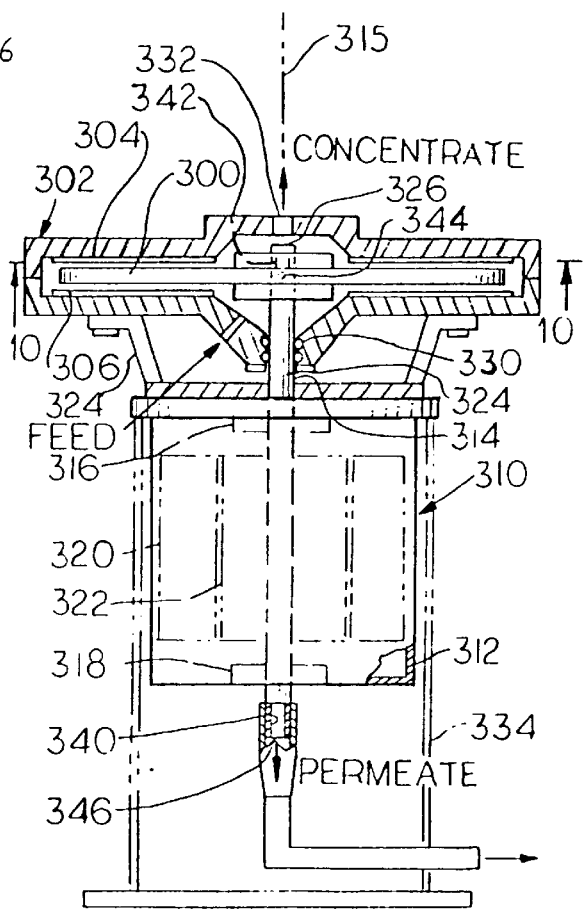
FIG. 9
FIG. 8

SIMPLIFIED FILTRATION SYSTEM

CROSS-REFERENCE

This is a continuation-in-part of U.S. application Ser. No. 08/290,244 filed Aug. 15, 1994.

BACKGROUND OF THE INVENTION

A feed fluid such as waste water, can be separated into permeate, such as pure water which passes through a membrane, and concentrate which includes water with a high concentration of particles. Such separation can be accomplished by the use of one or more membrane packs lying within a container. Fouling of the membrane packs, by the buildup of particles at the surface which block pores of the membranes, can be reduced by rapidly rotating the membrane packs, as described in U.S. Pat. No. 4,025,425, by Croopnick. Fouling can be further reduced by placing stationary turbulators close to the membrane pack faces to create turbulence in the gap between them. It is noted that when a membrane pack has large pores (many microns wide) it may be referred to as a filter pack, but applicant uses the term membrane pack herein for both.

A common filtration construction directs the feed fluid in series through the gaps. Such serial flow has the advantage that the feed fluid moves along a long path in contact with the surfaces of the membrane packs, to remove a considerable portion of the filtrate. However, such serial flow has a disadvantage that feed fluid is not homogeneous, in that the concentration of particles in the feed fluid may increase between the upstream and downstream ends of the feed fluid path. Also, there can be a large pressure drop along the long path. The flow of the feed fluid in parallel through all of the gaps is seldom used, because the short path length requires repeated return of the fluid for reflow, resulting in large pressure losses during flow near the center of the rotor. A filtration system which allowed the feed fluid to flow along a long path in contact with the membrane surfaces while maintaining the feed fluid largely homogeneous in pressure and particle concentration, would be of value in the filtration of a wide variety of fluids.

SUMMARY OF THE INVENTION

In accordance with one embodiment of the present invention, a filtration system is provided, of the type wherein at least one rotatable membrane pack has surfaces slightly spaced from substantially stationary turbulators to leave gaps through which feed fluid moves, which produces enhanced filtration. The system is operated so the feed fluid is flowed into a conduit that connects the radially outer edges of the gaps that separate the rotating membrane pack(s) from the stationary turbulators. Portions of the feed fluid flow largely radially inwardly along inward paths that lie adjacent to the stationary turbulators, and flow largely radially outwardly along outward paths that lie adjacent to the rotating membrane pack(s), to produce a largely circulating flow along each gap. Portions of the fluid that have moved radially inwardly and outwardly along a path, pass into the feed conduit to move to another gap, while other portions move back into the same gap along the inward paths. The feed fluid moves along a long path in moving into and out of each of the gaps and flowing radially inwardly and outwardly along each gap, and yet a substantially homogeneous feed fluid is maintained because fluid in each gap is constantly mixed with fluid from other gap(s) by way of the feed conduit.

The centrifugal force and large shear (difference in fluid velocity near the pack surfaces) minimizes the buildup of particles at the membrane surface which would clog its pores. The stationary turbulators have apertures or recesses to leave spokes, which helps create shear.

A low cost system with one or a limited number of membrane packs, can be made at lower cost by better utilizing the motor. The motor is made with a long protruding shaft portion that extends into the filtration container and that directly supports the membrane pack(s). The container is fixed to the motor housing. This allows use of the motor shaft bearings instead of additional container bearings. A pump which uses a rotating pump member that creates centrifugal force can be constructed with the rotating pump member also on the motor shaft.

The motor shaft has a passage with one end connected to the membrane pack(s) to receive permeate, and with the other end discharging the filtrate.

The novel features of the invention are set forth with particularity in the appended claims. The invention will be best understood from the following description when read in conjunction with the accompanying drawings.

BRIEF DESCRIPTION OF THE DRAWINGS

FIG. 3 is a view taken on the line 3—3 of FIG. 2.

FIG. 5 is an enlarged view of a portion of the apparatus of FIG. 4.

FIG. 6 is an enlarged view of a portion of the apparatus of FIG. 5.

FIG. 7 is a view taken on the line 7—7 of FIG. 3, but with the axial dimension exaggerated, and with pluses (+) indicating flow into the paper and circles indicating flow out of the paper.

FIG. 8 is a sectional view of a rotary filtration apparatus of another embodiment of the invention.

FIG. 9. Is an exploded isometric view of the apparatus of FIG. 8.

DESCRIPTION OF THE PREFERRED EMBODIMENTS

Figure 1:
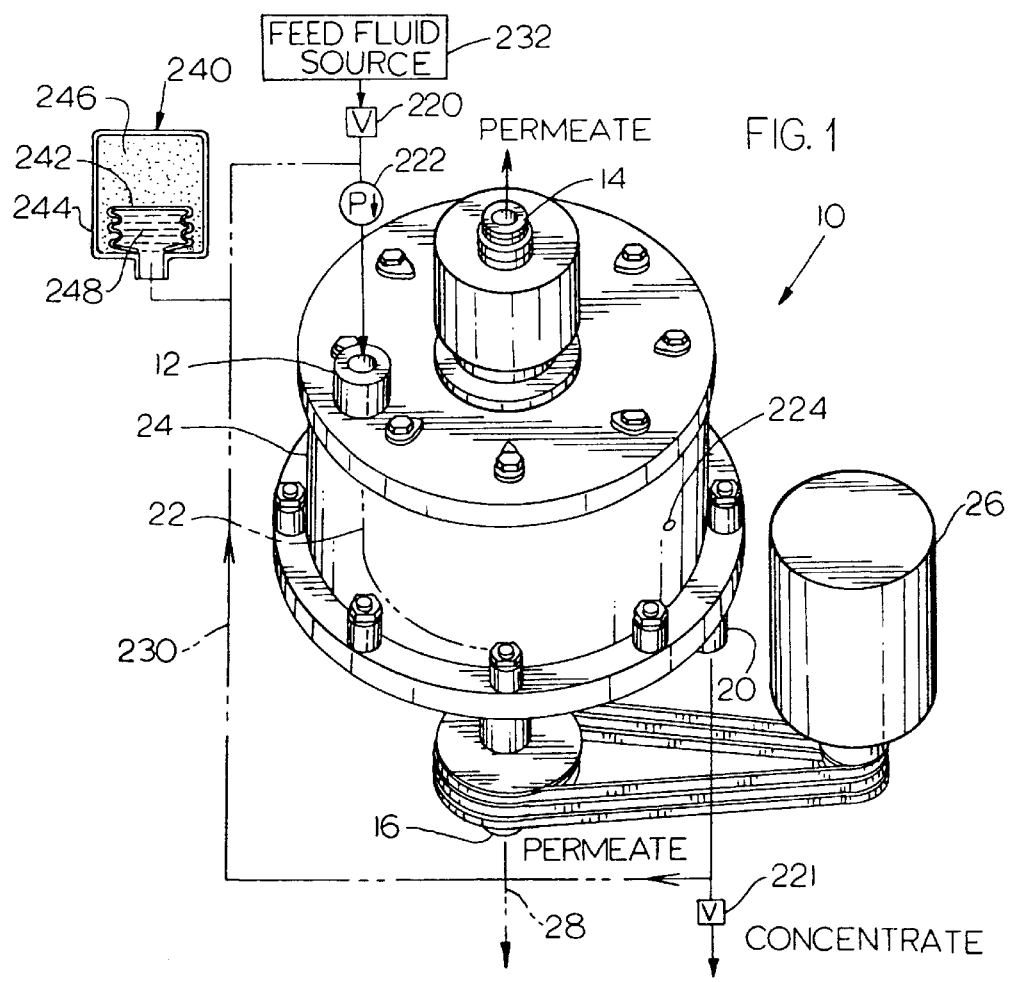
FIG. 1 is an isometric view of a rotary filtration apparatus constructed in accordance with one embodiment of the present invention.

FIG. 1 illustrates a rotary filtration apparatus 10 which has a feed fluid inlet 12 for receiving feed fluid. The feed fluid generally includes a liquid and particles in the liquid which are of micron size (average diameter less than ten microns) or submicron size. The apparatus separates the feed fluid into filtrate, or permeate which flows out of permeate outlets 14, 16, and concentrate which flows out of an outlet 20 (or out of an inlet 12 in the case of batch processing). Concentrate comprises liquid with a high concentration of particles, and is left after much of the permeate in the original feed fluid has been removed. The apparatus includes a rotor 22 which lies within a sealed container 24. A motor 26 is coupled to the rotor to rapidly rotate it about an axis 28.

Figure 2:
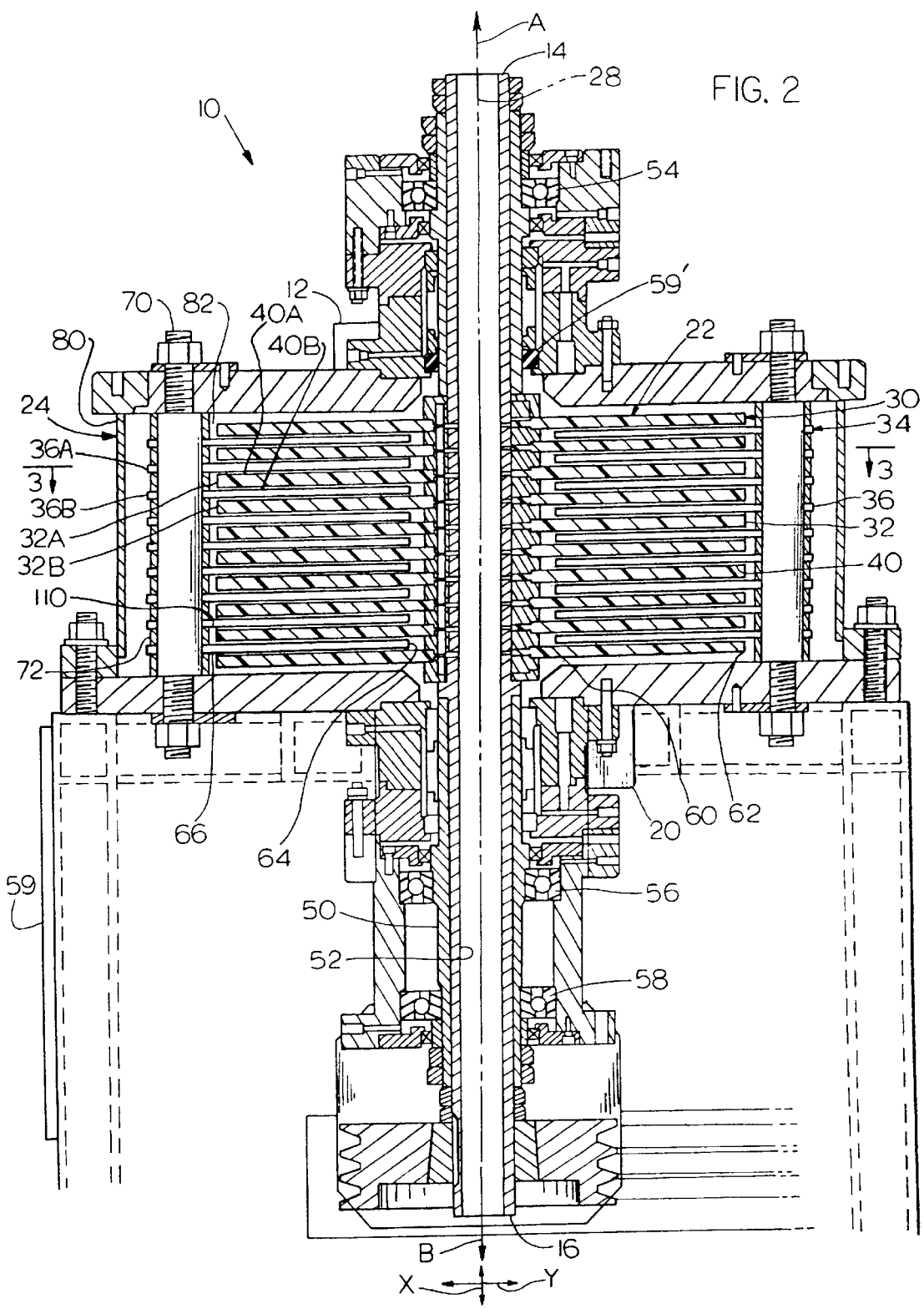
FIG. 2 is a sectional side view of the apparatus of FIG. 1.

As shown in FIG. 2, the rotor 22 includes a stack 30 of axially-spaced (in direction X that is parallel to the axis) membrane packs 32 that lie within the container. The apparatus also includes a stack 34 of plate-like separator elements or turbulators 36. The turbulators 36 are stationary, and positioned so a turbulator 36 lies between each pair of membrane packs 32 and at the ends of the stack. This leaves gaps 40 between each surface of the membrane pack and adjacent surfaces of turbulators. The gaps extend radially (parallel to radial directions Y), in that they have large radial dimensions Y and short axial dimensions x. In particular, FIG. 2 shows first and second membrane packs 32A, 32B and shows turbulators 36A and 36B and shows first and second gaps 40A, 40B on opposite sides of the first membrane pack 32A.

FIG. 2 shows that the membrane packs 32 are mounted at their axial middles on a shaft 50 which is hollow to form a permeate conduit 52, with outlets 14, 16 at the shaft opposite ends. The shaft is rotatably mounted on bearing 54, 56, 58, with a stand indicated at 59 to support the lower bearings, and with the upper bearing supported on the container 24.

The membrane packs 32 have radially inner and outer ends 60, 62. The inner ends 670 are mounted on the shaft, while the outer ends 62 are free and therefore unsupported. The turbulators 36 have radially inner and outer ends 64, 66. The outer ends 66 are mounted on a group of tie rods 70, and are spaced apart by spacers 72. The radially inner ends 64 of the turbulators are free and therefore unsupported.

As shown in FIG. 3, each of the separator elements or turbulators 36 has a face 160 with recesses in the face in the form of through apertures 131–138 that leave turbulator face elements in the form of spokes 141–148. The apertures extend radially (away from axis 28) further than the peripheries 150 of the membrane packs. This leaves spaces 152 at the radially outer portions of the apertures, along which feed fluid can move. Also, the radially outer ends 66 of the turbulators are radially spaced from the sidewalls 80 of the container 24. This leaves additional space 154 along which feed fluid can move. The spaces 152, 154 form a feed conduit 82, the conduit 82 being of largely toroidal shape (with the peripheries of the turbulators lying in it).

Figure 4:
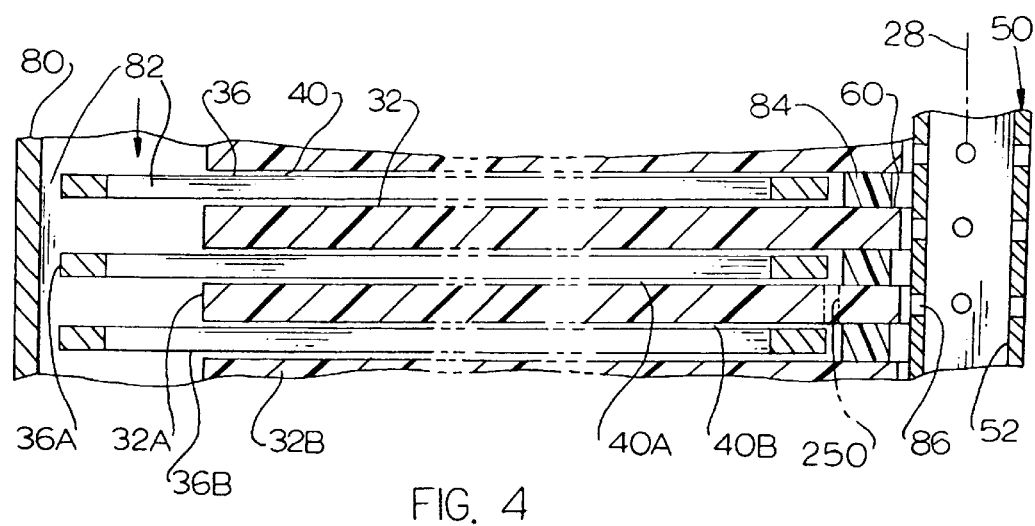
FIG. 4 is a sectional view of a portion of the apparatus of FIG. 2, taken on the line 4—4 of FIG. 3.

As shown in FIG. 4, the cross sectional area of the feed conduit 82, as seen in the sectional view of FIG. 4, is much greater than that of any of the gaps 40. As a result, the feed fluid tends to be substantially homogenous through the filtration apparatus, in that there is a substantially uniform pressure of the feed fluid and a substantially uniform concentration of solids in the liquid of the feed fluid. It is noted that the radially inner ends 60 of the membrane packs are spaced apart by seal spacers 84. Permeate flows radially inwardly along each membrane pack, and through holes 86 in the rotor shaft and along the permeate conduit 52 of the shaft.

FIG. 5 illustrates the flow of fluids in the gaps such as 40A and 40B and along the feed conduit 82. Before the membrane packs such as 32A begin to rotate, feed fluid 90 fills the feed conduit 82 and the gaps such as 40A, 40B. When the membrane pack 32A is rapidly rotated, fluid lying adjacent to the membrane pack surface 92 rotates with the membrane pack. Such rotation results in centrifugal force which causes feed fluid lying adjacent to the surface 92 to move radially outwardly along an outward path 94 (which also includes circumferential components in the direction of membrane pack rotation). The radially outward flow along outward paths 94 results in a lower pressure at the radially inward end 100 of the gap, and this causes a radially inward flow of feed fluid along inward paths 102. The result is that there is a circulating flow of feed fluid along each gap. This circulating flow causes fresh feed fluid from the feed conduit 82 to repeatedly flow across the membrane pack surface 92.

Permeate of the feed fluid moves along membrane-crossing paths 104 through a membrane 105 or other filtering element into porous backup sheets 106 of the membrane packs, and in inward directions at 108 to the centers of the pack from which the permeate is removed.

It should be noted that the membrane or filtering element may be a polymeric membrane, a screen (woven or matt or etched), a porous ceramic, a sintered metal, or other construction that passes only small particles or molecules. Applicant uses the term "membrane pack" for all of such elements. Common processes include dialysis, electro dialysis, reverse osmosis, and various size filtration. Applicant's system is specially useful for microfiltration and is useful for ultrafiltration, although it possibly can be used for nanofiltration and even possibly for reverse osmosis.

At the radially outer ends 100 of the gaps, fluid moving along the outward paths 94 is mixed with the feed fluid, and some of the fluid (at least one percent) that has moved along the outer paths 94 is returned as indicated by path 112, while some of it (at least one percent) is moved into the feed conduit as indicated by path 114. The fluid that is not reticulated within the same gap 40A, can move along the feed conduit 82 and into another gap such as 40B. At the gap inner end 100, much of the fluid passes in a loop indicated at 120 back along the gap. Some of the fluid passes in paths 122 between adjacent gaps such as 40A and 40C, but since there is substantially the same pressure at the radially inner ends of both gaps 40A, 40C, there is little flow in the directions 122.

FIG. 6 indicates the velocity profile, in a circumferential direction, (the radial velocity component is not shown) of feed fluid passing along a gap 40, by the length of the arrows. The circumferential direction is perpendicular to the radial direction and is parallel to the membrane pack surface motion. The path 93A is very close to the membrane pack surface 92, and the fluid moves at almost the same speed as the rotating surface 92. The velocity at path 93 is much less than the velocity at 93A, and the difference component 93D tends to sweep away particles 111 from the surface 92 of the membrane pack. This phenomenon can be referred to as the localized shear that tends to sweep particles from the surface. The magnitude of such shear, for a given velocity of the surface 92 with respect to the stationary separator element surface 113 of the separator element, depends upon the thickness 116 of the gap. The smaller the thickness 116, the greater the localized shear effect, or ratio of velocity difference 93D with distance 118 along the gap. Applicant prefers to make the gap 116 as small as possible, but must prevent the surfaces 92, 113 from touching since this could cause damage to the membrane pack. Applicant is able to obtain a gap thickness 116 of about two millimeters without causing membrane pack damage in a stack of many tens of membrane packs. In addition to the velocity differential per unit distance, the small gap results in large turbulence at the surfaces, and such turbulence near surface 92 also tends to sweep away particles that might otherwise block the pores of the membrane. It is noted that the large circumferential fluid movement at 93A and 93 results in fluid near the membrane pack flowing radially outwardly.

Thus, by applicant connecting a feed conduit to the radially outer ends of the gaps between membrane packs and separator elements, applicant causes a recirculating flow through each of the gaps, wherein feed fluid moves radially inwardly near the surface of the separator member and radially outwardly near the surface of the filter packs. Feed fluid moving largely radially outwardly near the outward ends of the gaps, flows into the feed conduit and also recirculates. With fluid circulating, perhaps several times, through many gaps, applicant obtains the advantages of a serial connection of the gaps, of having each quantity of fluid move along many membrane pack surfaces to remove a large proportion of the filtrate from the feed fluid. Applicant avoids disadvantages of a serial connection, but instead obtains a substantially homogenous fluid throughout the apparatus, in that the pressure and concentration of solids is about the same everywhere. As discussed above, the substantially uniform pressure allows applicant to apply an optimum pressure to all of the feed fluid. For example, in one situation, a pressure of 40 psi will produce a high flow of permeate into the membrane packs while obtaining minimal fouling of the membrane packs, while a pressure of 80 psi could cause fouling and a pressure of 20 psi could result in a low permeate flow rate. The optimum pressure depends upon the concentration of solids. Applicant can adjust the rate at which concentrate is drawn off, based on the permeate flow, to vary the concentration of solids so as to minimize membrane fouling while still obtaining a considerably permeate flow.

As shown in FIG. 3, applicant prefers to construct each turbulator 36 with apertures 131–138, to leave spokes 141–148 that form wall portions on circumferentially (perpendicular to a radial line) opposite sides of each aperture. One advantage of the apertures is that they result in the same pressure on opposite faces 160, 162 of the element, in addition to creating turbulence. Applicant prefers that the membrane packs have a small thickness such as 6 mm, with the gaps each having a thickness such as 3 mm, for a system using membrane packs of 16 inches (41cm) diameter. Each turbulator has at least one aperture in each imaginary 90° sector 164 of the turbulator, and with the apertures occupying at least 10° of the arc of each sector and with at least one spoke or the like lying in each sector.

When the membrane packs rotate so portions shown in FIG. 7 move in the circumferential directions of arrows 170, feed fluid at 172 lying adjacent to the pack face 92 also moves circumferentially. Applicant constructs the turbulator so each spoke such as 144, 145 with a leading edge 174 that is designed to interfere with circumferential fluid movement. The result is a large change in fluid velocity over a short distance near the membrane pack face, which helps sweep away particles.

The flow near the membrane packs is usually turbulent, so the elements 36 are referred to as "turbulators". Of course, in the absence of a turbulator, the fluid between a pair of membrane packs would soon rotate with the packs. With the turbulators, most of the fluid is static or only slowly rotating, which results in a rapid change in velocity near the membrane packs. The cross section of each spoke such as 144 in FIG. 7 (in which the thickness is exaggerated) is selected so the spoke is self-centering. That is, if the spoke approaches the face 93 of one membrane pack, the reaction of the spoke with fluid moving in the circumferential direction 170 is to move the spoke away from the membrane pack surface 93.

Applicant has experimented with turbulators having different numbers of spokes. It was found that a turbulator such as shown in FIG. 3, which has eight spokes, was best in the tests. A turbulator with four spokes operated almost, but not quite, as well. The number of spokes is preferably at least four but not more than sixteen. The radially inner ends of the spokes may be tied together by a 360° continuous hub 180. The radially outer ends of the spokes may be tied together by a continuous rim 182. The apertures and spokes can be angled from a radial direction.

The membrane packs are rotated rapidly enough that large centrifugal forces and large shear is created to avoid membrane fouling. In one system that applicant designed, membrane packs are of 16 inchs (40 cm) diameter and the gaps are 3 mm thick. The member packs are rotated at at least 200 rpm, and usually at about 760 rpm to 1000 rpm. At 200 rpm, the average surface velocity (at a point four inches from the axis) is about 2 meters per second. Thus, the system operates with an average membrane pack velocity of at least 2 meters per second, and a velocity at the pack periphery of at least 4 meters per second. The most effective rotational speeds for membrane packs usually creates centrifugal forces that increase pressure by at least 20 psi.

The rotary filtration apparatus 10 (FIG. 1) can be operated in a batch or continuous process, or in a combination. In a batch process, feed fluid with a predetermined concentration of solids, such as 200 ppm (parts per million) is pumped into the container. Inlet and outlet valves 220, 221 are closed. A pump 222 may be connected to a recirculation conduit 230 to maintain a more uniform concentration of particles, although this can be accomplished within the container 24 (e.g. by dividing the toroidal feed conduit 82 of FIG. 3 into two parts and pumping fluid up in one part and down in the other). The inlet and outlet 12, 20 form axially spaced locations of the feed conduit, and the recirculation conduit 230 lies outside of the feed conduit A sensor 224 is connected to the container to sense the concentration of particles. The motor 26 is energized so the rotor 22 rotates at a predetermined speed, and permeate is constantly drawn from the feed fluid, while the concentration of particles in the feed fluid increases. The sensor 224 senses this, and can control the pump 222 to change the pressure of the feed fluid, and also control the motor 26 to change the speed of rotation of the rotor, for optimum conditions (large permeate flow into the membrane pack and low fouling of the membrane pack surfaces). In a continuous process, feed fluid can flow from a source 232 continually, though at a slow rate, into the feed fluid inlet 12. Concentrate flows out of the outlet 20, for use or for further processing.

FIG. 1 shows an accumulator 240 (FIG. 1) connected to the feed conduit 80 to assure that the pressure of feed fluid will change only slowly.

FIG. 2 shows that permeate exits the apparatus in opposite directions A, B through opposite ends of the shaft at 14 and 16. Where there is a large filtrate flow, this allows for the use of a smaller shaft and bearings 54, 56, 58 and seals such as 59, which reduces cost.

FIG. 4 indicates that holes 250 can be formed in the radially inner ends of the membrane packs to allow feed fluid to flow largely axially from one gap to another at their inner ends. However, there would be only small flow through such a hole.

In one application, aluminum oxide particles (originally used for dyes) of a size of 0.5 microns and up, were to be removed from a waste stream of salt water and dissolved solids. The aluminum oxide particles were to be concentrated from four percent to twenty percent of the volume of the stream, by removing the salt water and dissolved solids which constitute the permeate of the waste stream. Larger particles had been previously removed by settling and screening, so the largest particles were no more than about 10 microns in diameter. The feed fluid is initially maintained at a pressure of 40 psi and the membrane packs are rotated at 800 rpm. As the concentration increases, the pressure can be maintained constant, or can be increased slightly. Thus, after the concentration increases, the speed is increased to 1,000 rpm and the pressure is increased to 50 psi.

Figure 10:
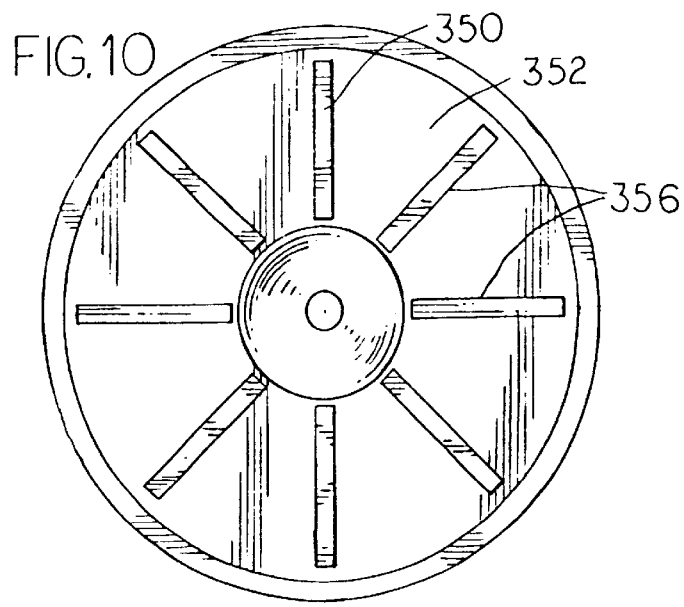
FIG. 10 is a view taken on line 11—11 of FIG. 8.

Many application require a low cost filtration system, which can use a single membrane pack or only a few of them. FIGS. 8–10 show a very low cost system that includes a single membrane pack 300. The membrane pack lies in a container 302, with turbulators 304, 306 at opposite surfaces of the membrane pack. A motor 310 which rapidly rotates the membrane pack, is fully utilized to minimize the cost of the system. The motor has a motor housing 312, a motor shaft 314 extending along an axis 315, and motor bearings 316, 318. Motor windings 320 that are electrically energized, interact with a device 322 (windings or magnets can be used at 320 or 322) on the motor shaft to turn it.

Applicant uses a motor shaft 314 with an extended end 324 fixed to the membrane pack to rotate it. As a result, no bearings, in addition to the motor bearings 316, 318, are required. The container 302 is fixed to the motor housing 312 through a mount 324. The motor shaft extended end 324 is cantilevered and its extreme end 326 lies in the container. The container has a single dynamic pressure seal 330 to prevent the outflow of pressured fluid.

The elimination of extra bearings and all but one dynamic seal reduces the cost of the system. Applicant provides a concentrate outlet at 332. A stand is indicated at 334. It would be possible to fix an extension to an existing motor shaft, although the shaft extension would have to be precisely mounted to avoid wobble. Applicant prefers a one-piece integral motor shaft.

Applicant forms a passage 340 along all or almost all of the length of the motor shaft. One end 342 of the passage lies in the shaft cantilevered end 326 where the shaft has a hole 344 in communication with the membrane pack 300 to receive permeate from it. The other end of the passage 346 discharges the permeate. The opposite ends 342, 346 of the passage lie on opposite sides of the motor windings 320 and motor bearings 316, 318.

Each turbulator 304, 306 has a surface or face 350 facing the membrane pack, with the turbulator surface having a plurality of recesses 352 leaving face elements 356 that form the face 350. The turbulator face lies directly opposite a face or surface 354 of the membrane pack. The surfaces 358 of the face elements lie in a plane that is parallel to and closely spaced from the adjacent membrane pack surface. The turbulator has four 90° sectors that are circmferentially spaced about the axis 315. Each imaginary 90° sector of the turbulator has recesses 352 that occupy at least 10% of the area of the sector and has corresponding projecting face elements 356 that occupy at least 10% of the area of the sector. The face elements preferably form a plurality of largely radially-extending (with respect to the motor shaft axis) spokes, with 4 to 16 spokes preferred, and with the spokes angularly spaced by no more than 90°.

The same construction, which uses the cantilevered motor shaft, and preferably with a passage along the motor shaft can be used for several membrane packs. If a large number of membrane packs are used, then a bearing may be required at least at the top of the container in FIG. 8.

Figure 11:
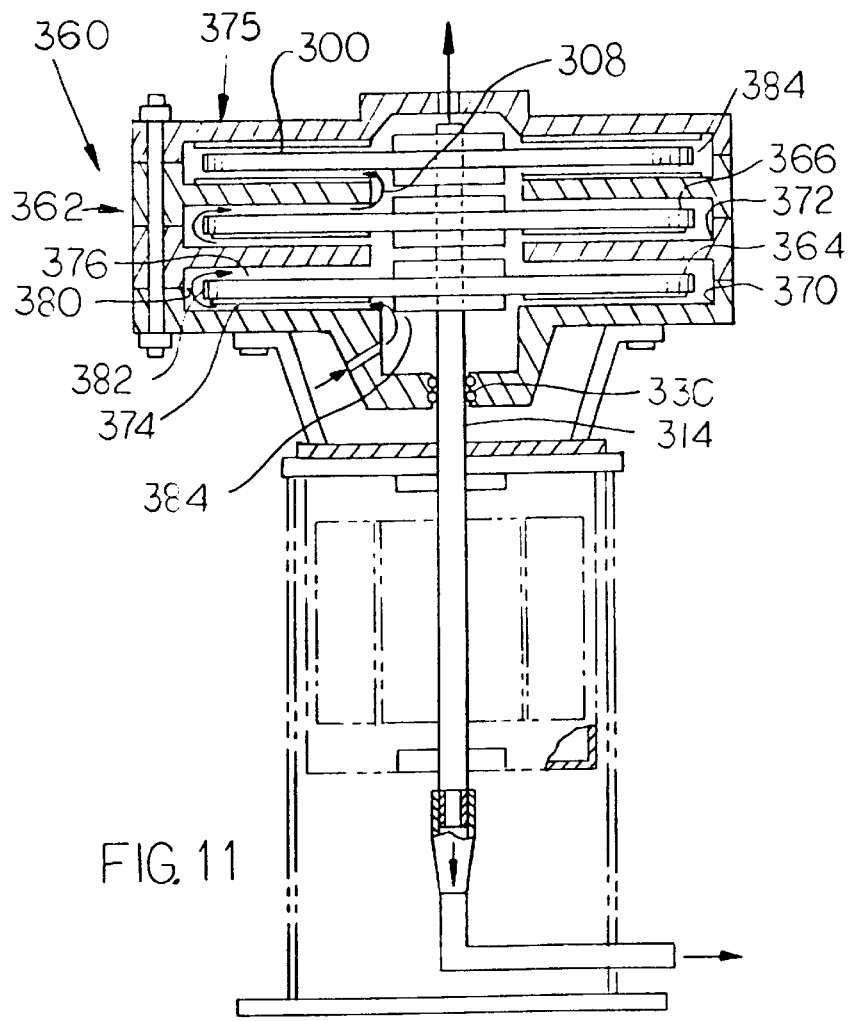
FIG. 11 is a sectional view of a rotary filtration of another embodiment of the invention.

FIG. 11 illustrates another system 360 which includes one membrane pack 300 that lies in a membrane pack region 301, and a pressurizing device 362. The pressurizing device includes discs 364, 366 that are mounted on the motor shaft 314. Each of the discs 364, 366 lies in a chamber pump region 370, 372 of the container 375. As fluid moves through each chamber pump region such as 370, it first passes part 374, where the rotating disc 364 urges the fluid to rotate and move radially outward, which increases fluid pressure. Vanes 376 on the lower surface of the disc enhances fluid rotation and consequent pressurization. The fluid moves along an outer part 380 of the chamber pump region around the periphery 382 of the disc to the second part 384. Inwardly pushing vanes or no vanes lie on the upper sides of the discs, so fluid pressure is reduced only slightly or increased along the second part 384 of the chamber region.

A pressure increase of perhaps 20 psi occurs along region 370. A similar 20 psi increase may occur along region 372, for a total pressure of 40 psi applied to the inlet of membrane pack chamber region 384 containing the membrane pack. The pressurizing device does not require any moving parts other than the motor shaft 314 to turn the discs 364, 366. Since the motor shaft 314 is already present, as is the dynamic seal 330, the pressurizing device is added with only a small additional cost to eliminate the need for an external pump. The outlet of the pressurizing device of 368 is directly connected to the membrane chamber 384 through the same container 375.

Thus, the invention provides a filtration system wherein feed fluid moves through axially thin gaps between membrane packs and turbulators. The system obtains advantages of a serial connection of the gaps, of a long flow path along the membrane surfaces, while avoiding disadvantages of widely varying pressure and particle concentration. The system includes a feed conduit that connects to the radially outer ends of the gaps, to allow fluid to flow in a loop through each gap, and to promote homogeneous fluid throughout the system. The turbulators preferably have apertures or recesses to leave face elements such as in the form of spokes. A simple system can use the motor bearings to rotatably support one or more membrane packs, and the motor shaft to carry away permeate. The motor shaft can also be used to support discs tying in chamber regions to pressurize the fluid.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Filtration apparatus which includes a container, a shaft portion lying on an axis and extending into said container, an electric motor that rotates said shaft portion about said axis, at least one membrane pack mounted on said shaft portion and lying in said container with said membrane pack having an inside for carrying filtrate, an outlet conduit coupled to the inside of said pack for carrying away filtrate, and a feed inlet coupled to the inside of said container to flow feed fluid therein, where said motor includes a fixed housing, a pair of motor bearings mounted on said motor housing, and a motor shaft rotatably mounted on said motor bearings, wherein:

said motor shaft projects into said container along said axis and forms said shaft portion which rotates said membrane pack and supports said membrane pack in rotation, with the motor bearings being used to support said membrane pack in rotation.

2. The apparatus described in claim 1 wherein:

said motor has electrically energized windings and said motor shaft has a passage extending through said windings along said axis with said passage having proximal and distal ends lying beyond opposite ends of said windings, with said passage proximal end coupled to the inside of said pack and with said passage distal end having an opening for discharging said filtrate.

3. The apparatus described in claim 1 wherein:

said motor bearings are the sole bearings that support said shaft in rotation.

4. The apparatus described in claim 1 wherein:

said motor lies outside said container and said container is fixed to said motor housing.

5. The apparatus described in claim 1 wherein:

said shaft has an extreme end that lies in said container, and said container has a hole through which said shaft extends and has a fluid-tight dynamic seal that seals to said shaft.

6. The apparatus described in claim 1 including:

a pressurizing device which includes at least one disc fixed to said motor shaft, with said disc having opposite faces and a periphery;

said container includes a membrane pack region that surrounds said membrane pack and a pump chamber region that surrounds said disc and that is connected to said membrane pack region.

7. Filtration apparatus, comprising:

a fixed sealed container;

at least one membrane pack lying in said container to rotate therein;

a motor which has a fixed motor housing lying outside said container, a motor shaft which is rotatable about an axis, and at least a pair of bearings which rotatably support said motor shaft;

said motor shaft extends into said container and said membrane pack is fixed to said motor shaft to rotate about said axis;

said container being fixed to said motor housing.

8. The filtration apparatus described in claim 7 wherein:

said shaft has a proximal end projecting in a first direction from said motor housing and lying at least partially within said container and an opposite distal end projecting in an opposite second direction from said motor housing;

said shaft has a passage extending from said proximal end to said distal end thereof, with the passage at said shaft proximal end being coupled to the inside of said pack, and with the passage at said shaft distal end having an opening for passing out fluid.

9. The filtration apparatus described in claim 7 including:

a pressurizing device that includes at least one rotatable member fixed to said motor shaft to rotate with it, with said container having a pump region surrounding said rotatable member and a membrane pack region surrounding said membrane pack and connected to said pump region.

10. The filtration apparatus describe in claim 9 including:

a dynamic seal which seal said chamber to said motor shaft, with said pump region and membrane pack region both being isolated from the environment by said dynamic seal.

11. The filtration apparatus described in claim 7 wherein:

said motor is an electric motor that lies outside said sealed container.

* * * * *